T. H. THOMAS.
FLUID PRESSURE BRAKE.
APPLICATION FILED OCT. 20, 1921.
1,428,997.
Patented Sept. 12, 1922.
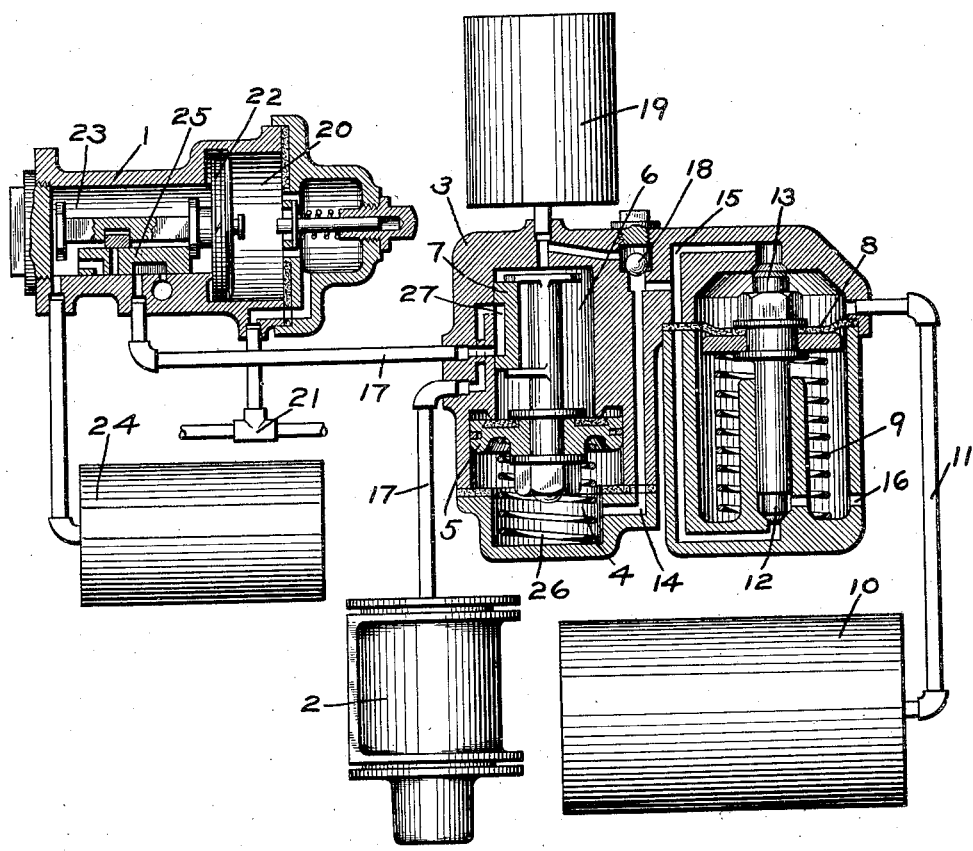
INVENTOR
THOMAS H. THOMAS
BY Wm. M. Cady
ATTORNEY Patented Sept. 12, 1922.

1,428,997

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed October 20, 1921. Serial No. 509,084.

*To all whom it may concern:*

Be it known that I, THOMAS H. THOMAS, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes and has for its principal object to provide means operated upon a predetermined reduction in pressure in the main reservoir of a locomotive brake equipment for applying the brakes.

In the accompanying drawing, the single figure is a sectional diagrammatic view of a fluid pressure brake equipment with my improvement applied thereto.

While my invention is adapted to be applied in connection with a locomotive brake equipment of the well known E T type in which a so-called distributing valve device is employed for controlling the admission and exhaust of fluid under pressure to and from the locomotive brake cylinders, for the sake of simplicity, the invention is illustrated in the drawing as applied in connection with an ordinary triple valve device 1 which controls the supply and release of fluid under pressure to and from a brake cylinder 2.

According to my invention, a valve device 3 controls communication through pipe 17 from the triple valve device 1 to the brake cylinder 2 and comprises a casing having a piston chamber 4 containing a piston 5 and a valve chamber 6 containing a slide valve 7 operated by piston 5.

For controlling the operation of piston 5, a flexible diaphragm 8 is provided, which is subject on one side to the pressure of a coil spring 9 and on the opposite side to the pressure of the main reservoir 10 as supplied through pipe 11. The diaphragm 8 carries valves 12 and 13, the valve 12 at one side being adapted to control the venting of fluid under pressure from piston chamber 4 through passages 14 and 15 to an atmospheric exhaust port 16 and the valve 13 at the opposite side of the diaphragm being adapted to control communication through which fluid under pressure is supplied from the main reservoir 10 to piston chamber 4 and also past a check valve 18 to an emergency reservoir 19, which is connected to valve chamber 6.

The triple valve device 1 may comprise a casing having a piston chamber 20 connected to brake pipe 21 and containing the usual piston 22 and having a valve chamber 23 connected to the usual auxiliary reservoir 24 and containing slide valve 25 adapted to be operated by piston 22.

In operation, with the main reservoir 10 charged with fluid under pressure and the spring 9 such that it will move the diaphragm 8 upwardly if the main reservoir pressure should fall below a predetermined low degree, either through rupture of the main reservoir, breakage of the main reservoir pipe, or a slow drop in main reservoir pressure, if the main reservoir pressure is above the predetermined degree, as would normally be the case, the diaphragm 8 will be depressed against the resistance of the spring 9, closing the valve 12 and opening the valve 13, as shown in the drawing. Fluid from the main reservoir is then supplied to passage 15 and flows to piston chamber 4 and also past check valve 18 to emergency reservoir 19 and valve chamber 6. The opposing fluid pressures on the piston 5 being equal, the spring 26 maintains the piston 5 and slide valve 7 in the position shown in the drawing, in which a cavity 27 establishes communication from the triple valve device 1 through pipe 17 to the brake cylinder 2.

The brakes may now be applied and released by the usual functioning of the triple valve device, as will be apparent.

If the main reservoir pressure should fall below the predetermined degree for any cause, and for which the spring 9 is adjusted, then the diaphragm 8 will be moved upwardly by the spring 9, so as to close the valve 13 and open the valve 12. The opening of the valve 12 then permits the venting of fluid under pressure from piston chamber 4 to exhaust port 16, so that the pressure in valve chamber 6 and reservoir 19 operates to shift the piston 5 and slide valve 7 to a position in which communication from the triple valve device to the brake cylinder 2 is cut off, while communication is opened from valve chamber 6 to the brake cylinder 2. Fluid under pressure will then be supplied from the emergency reservoir 19 to the brake cylinder to effect an application of the brakes.

As the movement of diaphragm 8 depends upon the creation of a fixed predetermined differential pressure between the spring 9 and the main reservoir pressure, it will be evident that the device will be operative, no matter how slow the rate of reduction in main reservoir pressure may be.

Having now described my invention, what I claim as new and desire to secure by Letters Patent, is:

1. The combination with a brake cylinder and a valve device for normally controlling the supply of fluid to the brake cylinder, of a main reservoir, an emergency reservoir, an emergency valve device for supplying fluid from the emergency reservoir to the brake cylinder, and means operated upon a predetermined reduction in main reservoir pressure for effecting the operation of said emergency valve device.

2. The combination with a brake cylinder and a valve device for normally controlling the supply of fluid to the brake cylinder, of a main reservoir, an emergency reservoir, an emergency valve device operative to supply fluid from the emergency reservoir to the brake cylinder, a valve for venting fluid from said emergency valve device to effect the operation thereof, and a movable abutment subject to the opposing pressures of the main reservoir and a spring for operating said valve.

3. The combination with a brake cylinder and a valve device for normally controlling the supply of fluid to the brake cylinder, of a main reservoir, an emergency reservoir, an emergency valve device operative to supply fluid from the emergency reservoir to the brake cylinder, a valve for venting fluid from said emergency valve device to effect the operation thereof, a valve for controlling the supply of fluid under pressure from the main reservoir to said emergency valve device, and a movable abutment, subject to the opposing pressures of the main reservoir and a spring for operating said valves.

4. The combination with a brake cylinder and a valve device for normally controlling the supply of fluid to the brake cylinder, of a main reservoir, an emergency reservoir, an emergency valve device operative to supply fluid from the emergency reservoir to the brake cylinder, a valve for venting fluid from said emergency valve device to effect the operation thereof, a valve for controlling the supply of fluid under pressure from the main reservoir to said emergency valve device, and a movable abutment operative upon a predetermined reduction in main reservoir pressure for closing the supply valve and opening the vent valve.

5. The combination with a brake cylinder and a valve device for normally controlling the supply of fluid to the brake cylinder, of a main reservoir, an emergency reservoir, a piston normally subject to the opposing pressures of the main reservoir and the emergency reservoir, a valve operated by said piston for controlling communication from said valve device to the brake cylinder and from the emergency reservoir to the brake cylinder, a valve for venting fluid from the main reservoir side of said piston, and a movable abutment subject to the opposing pressures of the main reservoir and a spring for operating said vent valve.

In testimony whereof I have hereunto set my hand.

THOMAS H. THOMAS.